United States Patent

Schwerdhofer

[15] 3,695,729

[45] Oct. 3, 1972

[54] PLASTIC BICYCLE WHEEL ASSEMBLY AND MOLD FOR MAKING THE SAME

[72] Inventor: Hans Joachim Schwerdhofer, Schweinfurt, Germany

[73] Assignee: Fichtel & Sachs AG, Schweinfurt, Germany

[22] Filed: May 27, 1971

[21] Appl. No.: 147,511

[30] Foreign Application Priority Data

June 2, 1970 Germany..........P 20 26 837.5

[52] U.S. Cl. .......301/63 PW, 301/63 DD, 301/64 R, 301/74
[51] Int. Cl. ..............................................B60f 5/02
[58] Field of Search ..301/63 PW, 63 DD, 65, 64 SH, 301/105 B, 74

[56] References Cited

UNITED STATES PATENTS 2,606,076   8/1952   Frazer...................301/63 PW

FOREIGN PATENTS OR APPLICATIONS 278,896   11/1964   Australia..............301/63 PW
885,675   12/1961   Great Britain........301/63 PW

OTHER PUBLICATIONS

German Printed App. No. 1,505,848 April 1969.

*Primary Examiner*—Richard J. Johnson
*Attorney*—Kelman & Berman

[57] ABSTRACT

The hub shell and rim of a bicycle wheel are connected by a spoke system of thermoplastic synthetic resin composition forming a unitary body with the rim. The spoke system may consist either of two conical discs or two conical sets of four individual spokes defining therebetween gaps axially aligned with the spokes of the other set. Flanges on the hub are embedded in the discs or spokes. The transmission of thermal energy generated by friction in a transmission or a brake within the hub to the plastic spoke system is impeded by air-filled recesses in the flanges or elsewhere radially between the hub and the spoke system, or by the use of small engaged contact faces on the hub and flange.

16 Claims, 7 Drawing Figures

Fig.1
Fig.2
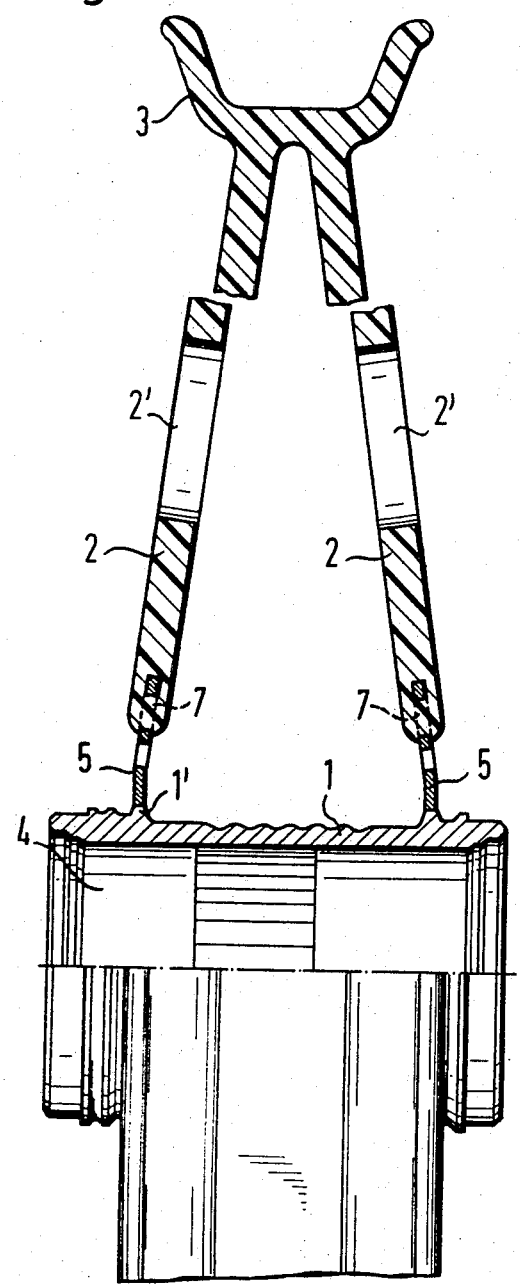
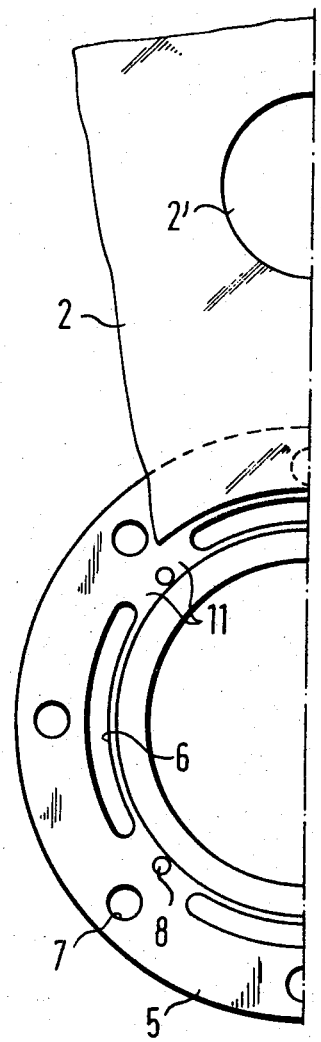
INVENTOR
Hans Joachim Schwerdhöfer
BY
Kelman and Berman,
AGENTS PATENTED OCT 3 1972  3,695,729
SHEET 3 OF 4
Fig.4
Fig.5
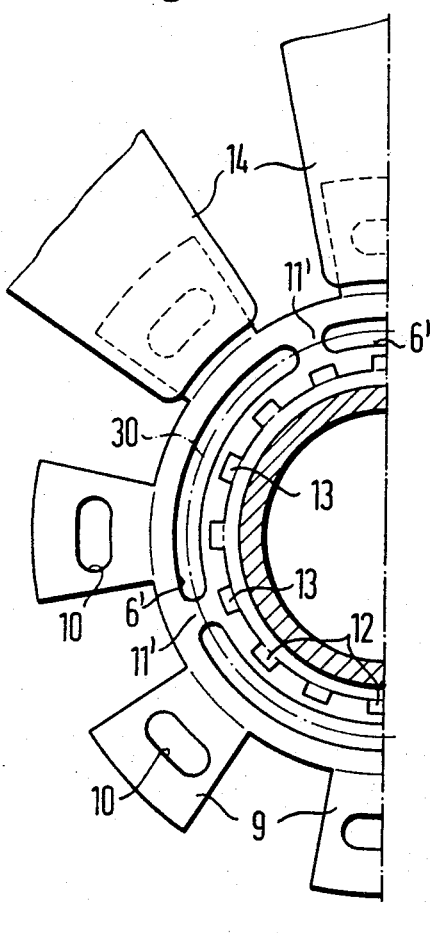
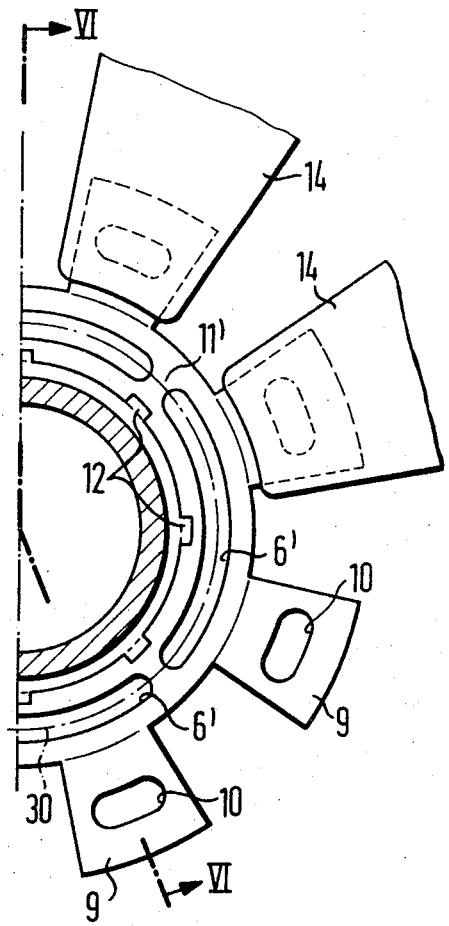
INVENTOR
Hans Joachim Schwerdhöfer
BY Kelman and German,
AGENTS

PATENTED OCT 3 1972

INVENTOR
Hans Joachim Schwerdhöfer
BY
Kelman and Berman,
AGENTS

PLASTIC BICYCLE WHEEL ASSEMBLY AND MOLD FOR MAKING THE SAME

This invention relates to wheels for bicycles and like vehicles, and particularly to a wheel in which the hub and rim are connected by a spoke system of thermoplastic synthetic resin composition, and to a mold for making a plastic assembly for such a wheel and for connecting the plastic elements to other parts of the wheel.

Thermoplastics have replaced metal in many vehicle applications, but their practical use has been limited heretofore to bicycle elements which are not essential to the basic functions of the bicycle. Yet, low weight and the ability of being injection-molded at low cost makes thermoplastic synthetic resin compositions a desirable material of bicycle construction.

The wire spokes of a bicycle are relatively heavy, and expensive to make and to assemble with other wheel parts. An important object of the invention is the provision of a strong and durable bicycle wheel in which the usual wire spokes are replaced by a spoke system of thermoplastic synthetic resin composition.

During normal operation of a bicycle, much kinetic energy is converted to thermal energy in the hubs by friction, and the operating temperature, particularly of a rear wheel hub, may be substantially higher than the softening temperatures of thermoplastic resin compositions available at attractive cost at this time. Another object of the invention is the provision of a bicycle wheel in which heat generated in the hub during operation, and particularly during use of a coaster brake, cannot reach the inherently air-cooled spoke system at a rate sufficient to soften the plastic of the system.

With these objects and others in view, as will hereinafter become apparent, the invention, in one of its more specific aspects, provides a wheel for a bicycle or like vehicle in which the central hub member and peripheral rim member centered in the axis of the hub member are connected by two spoke arrangements having respective peripheral portions fixedly fastened to the rim member and respective central portions, the spoke arrangements essentially consisting of thermoplastic synthetic resin composition. Two flanges secure the central portions of the spoke arrangements to respective axially terminal portions of the hub member against relative angular movement about the hub axis. A thermal insulating means is interposed between the spoke arrangements and the hub member for impeding radial flow of thermal energy from the hub member to the spoke arrangements.

In another aspect, the invention provides a split mold for molding a unitary body of the afore-mentioned composition in which the spoke arrangements are combined with the rim member, each spoke arrangement extends in a substantially conical surface about the hub axis, the conical surfaces converging axially from the hub axis toward the rim member, and each spoke arrangement consisting of several spoke members circumferentially spaced to define gaps therebetween, and so related to each other that each gap is axially aligned with a spoke member of the other arrangement.

The mold of the invention includes two mold members which are movable toward and away from a position of engagement in which respective walls of the mold members bound a cavity substantially conforming to the afore-mentioned unitary body and facing each other in the direction of the body axis. Each wall has several sector-shaped face portions distributed about the axis. Circumferentially alternating face portions of each wall are respectively near and remote from the wall of the other mold member in an axial direction. They define portions of the mold cavity conforming to the spoke members. A positioning arrangement is provided for securing the flanges in the mold cavity in a position in which respective parts of the flanges are embedded in the spoke members when the cavity is filled with the afore-mentioned resin composition.

Other features, additional objects, and many of the attendant advantages of this invention will readily be appreciated as the invention becomes better understood by reference to the following detailed description of preferred embodiments when considered in connection with the appended drawing in which:

FIG. 1 shows a bicycle wheel of the invention in fragmentary front elevation and partly in section on its axis;

FIG. 2 shows a portion of the wheel of FIG. 1 in front elevation;

FIGS. 4 and 5 illustrate the wheel of FIG. 3 in respective fragmentary, sectional views taken on the lines IV — IV and V — V;

Figure 3:
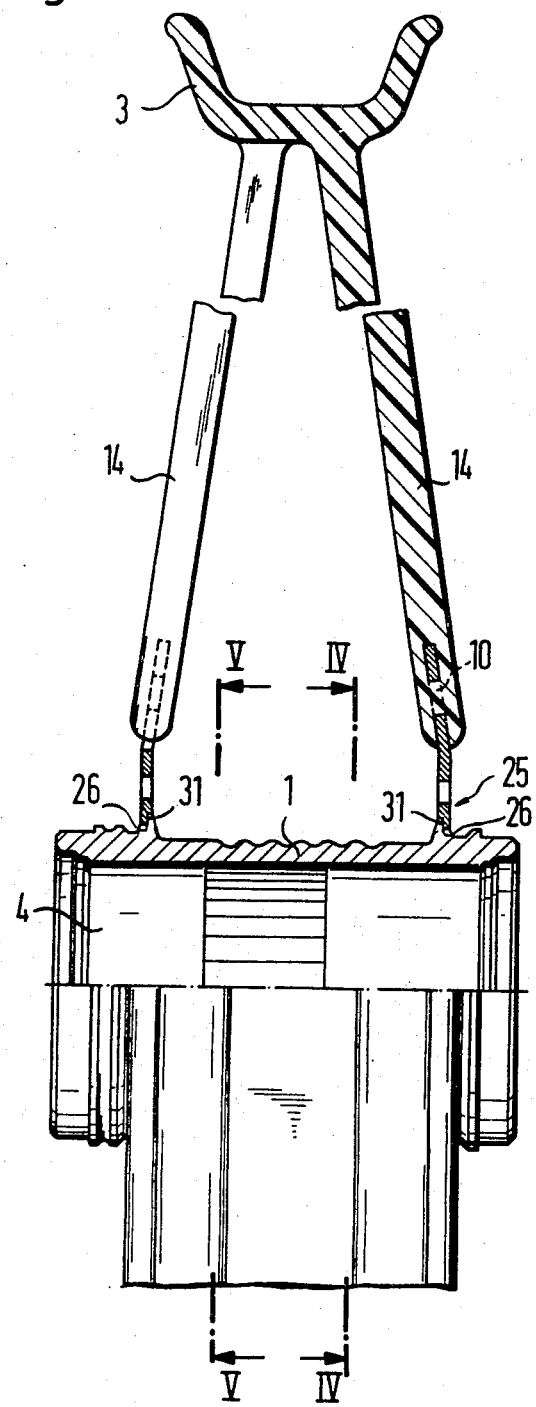
FIG. 3 shows a modified wheel of the invention in a view corresponding to that of FIG. 1.

Referring now to the drawing in detail, and initially to FIGS. 1 and 2, there is seen a partly assembled rear wheel of the invention for a bicycle. The principal elements shown are a metallic hub shell 1 and a unitary body of rigid polyvinyl chloride plastic which constitutes two conical discs 2 and the wheel rim 3, the discs 2 assuming the functions of the conventional wire spokes. The interior 4 of the hub shell 1 is empty at the assembly stage illustrated, and will be understood to enclose a multiple-speed transmission and a coaster brake in the finished wheel, the transmission and brake not being directly relevant to this invention and conventional.

The hub shell 1 is of approximately cylindrical shape and provided with annular projections 1' near the axial ends of its outer face. Two steel flanges 5 are respectively fastened to the projections 1' by a shrink fit or friction fit, one of the projections having a slightly smaller external diameter than the other, and the internal diameters of the flanges 5 being correspondingly different to facilitate mounting of the hub shell 1 in the flanges 5.

Each flange 5 is partly embedded in the central portion of the associated disc 2 whose peripheral portion is fixedly and integrally fastened to the rim 3. The discs thus are secured by the flanges 5 to the hub shell 1 against relative angular movement. Bonding between the discs 2 and the flanges 5 is improved by eight circular openings 7 in the part of each flange 5 which is embedded in the plastic of an associated disc 2, the plastic filling the openings 7 in the assembled wheel.

Four slots 6 in each flange 5 are elongated in a common circle about the hub axis. They are not covered by the plastic of the disc 2 and separate the radially innermost, annular portion of the flange 5, which is secured to the hub shell 1, from the radially outer portion secured to the associated disc 2. The two annular portions thus radially bound the slots 6 and are integrally connected by bridging portions 11 of the flange 5 which are dimensioned to transmit all necessary torque from the hub shell 1 to the rim 3. As is evident from FIG. 2, the combined circumferential dimension of the bridge portions 11 is but a small fraction of the combined circumferential dimension of the slots 6. Pilot bores 8 in the bridging portions 11 facilitate assembly of the flange 5 to other wheel elements in proper angular relationship.

Since the slots 6 are axially open, they are filled with air under all operating conditions of the bicycle wheel. Each body of air in a slot 6 is radially interposed between a disc 2 and the hub shell 1, and more specifically, between the inner and outer portions of the flange 5, and provides thermal insulation for impeding radial flow of thermal energy from the hub shell 1 to the disc 2 which could soften the plastic material of the disc 2 and ultimately release the disc 2 from the flange 5.

The slots 6 constitute respective recesses in the corresponding flange 5. The axial dimension of the slots is equal to that of the flange, but shallower recesses are effective by virtue of the insulating properties of the air contained therein. Relative large circular openings 2' in the disc 2 admit cooling air to the annular chamber bounded by the concave faces of the discs 2, the rim 3, and the exposed outer face portion of the hub shell 1 between the projections 1'. The cooling effect of the air passing through the openings 2' is most beneficial when the slots 6 are replaced by shallower recesses which do not pass air to the afore-mentioned annular chamber.

In the modified bicycle wheel illustrated in FIGS. 3 to 5, the hub shell 1 is connected to the rim 3 by two sets of eight spokes 14 each, both sets being integral with the rim 3 and secured to the hub shell 1 by respective flanges 25 which hold the spokes in two conical surfaces about the hub axis analogous to the arrangement of the discs 2.

Each flange 25 has a radially inner portion which is exposed to the ambient air and extends about the hub axis in an arc of 360°. As described with reference to the flanges 5, the flange 25 has four slots 6' which are elongated along a common circle 30 about the hub axis, and are separated by bridging portions 11' even narrower circumferentially than the aforedescribed bridging portions 11.

Eight integral lugs 9 project in a radially outward direction from the annular flange portion and are almost entirely embedded in the plastic material of respective spokes 14. Circumferentially elongated apertures 10 in each lug 9 enhance the strength of the bond between the plastic and the metallic lug 9 and impede radial heat flow along the lug within the spoke 14.

Another barrier to heat transfer from the hub shell 1 to the spokes 14 is set up at the junction of each flange 25 with the hub shell 1.

Two narrow, integral, annular collars 26 project slightly from the two axially terminal portions of the hub shell 1 in a radially outward direction. Eight axially even thinner and circumferentially narrow projections 31 are spaced 45° apart on each collar and further project in a radially outward direction from the axial portion of the collar nearest the other collar. Each flange 25 has eight recesses 12 open in a radially inward direction at its inner periphery. The projections 31 are received in respective recesses 12 under the resilient axial pressure of the two sets of spokes 14 which, when in the relaxed condition, are more nearly parallel than is shown in FIG. 3. Respective contact faces of the projections 31 are thus held in engagement with corresponding contact faces of the flanges 25 in the recesses 12.

While the conforming engagement of the projections 31 and the recesses 12 prevents any angular displacement of the flanges 25 and of the spokes 14 on the hub shell 1, the interface between the projections and recesses impedes heat flow, and the spokes 14 are thermally insulated to an adequate extent by the small area of the contact faces. Typically, the projections 31 have a radial dimension of 2.7 mm and a circumferential width of 4.2 mm. The axial width of each collar 26 in an actual embodiment is only 0.7 mm.

Adequate access of cooling air to the exposed outer face of the hub shell 1 between the collars 26 is provided by the angular arrangement of the spokes 14 in the two sets. As is best seen in FIGS. 4 and 5, the eight spokes 14 in each set circumferentially define eight gaps therebetween. The spokes 14 in each set are axially aligned with corresponding gaps in the other set. During rotation of the wheel, turbulent air is driven by the spokes over the exposed face of the hub shell 1. Because thermal energy cannot flow outward from the shell 1 toward the rim 3 in significant quantity due to the insulating effect of the interfaces between the recesses 12 and the projections 31, the temperature difference between the hub shell 1 and the ambient air is relatively great when the non-illustrated friction brake in the shell is operated for any length of time, and the cooling effect of the ambient air is directly related to the magnitude of the temperature difference.

The inner periphery of the flange 25 shown in FIG. 4 has eight notches 13 approximately equal in their radial and circumferential dimensions to the recesses 12, but extending through the full axial thickness of the flange, whereas the recesses 12 are axially open in one direction only. The notches 13 are approximately centered between the recesses 12. As will presently be explained, the flanges 25 are assembled with the unitary body constituted by the rim 3 and the spokes 14 during the injection molding of the body, and the flanges are inserted in the plastic body in such a manner that the recesses 12 of the flanges are axially aligned.

The hub shell 1 carrying the collars 26 with their projections 31 may thus be slipped through the flange 25 seen in FIG. 4 until both sets of projections 31 are located between the flanges 25 if the two sets of spokes 14 are spread apart against their resilient force. When the spokes thereafter are released and the hub shell 1 is turned slowly, all projections 31 drop into respective recesses 12, and the assembly stage seen in FIG. 3 is reached. The insertion of the gear transmission and of the brake follows conventional procedure and need not be described in detail.

Figure 6:
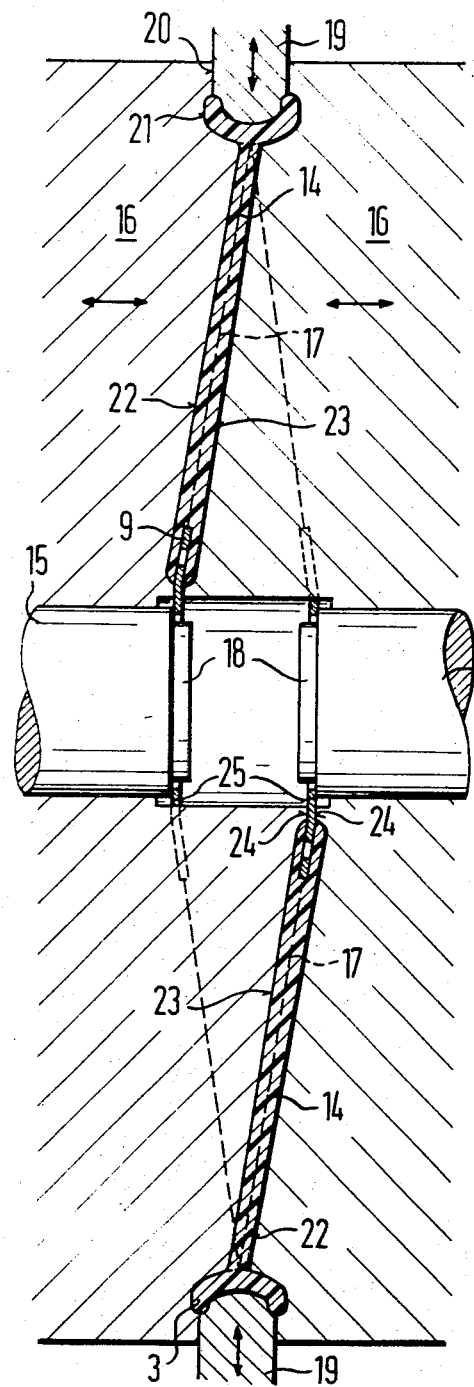
FIG. 6 shows an injection mold for making the plastic parts of the wheel of FIGS. 3 to 5, and the molded object produced, the view being in section corresponding to the line VI — VI in FIG. 5.
Figure 7:
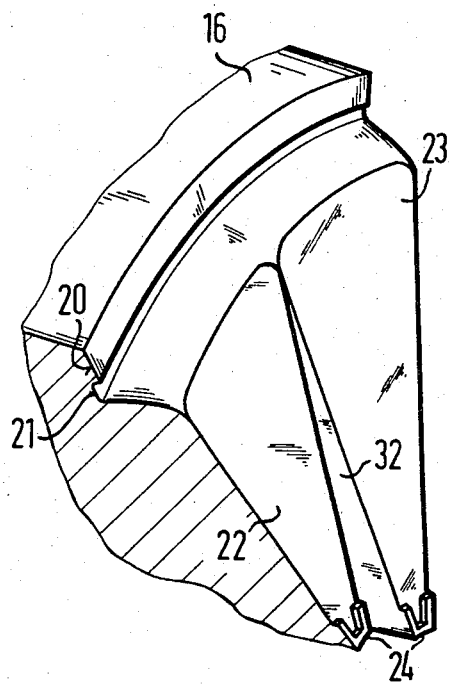
FIG. 7 illustrates a portion of the mold of FIG. 6 in a perspective view.

The plastic elements of the wheel shown in FIGS. 3 to 5 may be molded and simultaneously bonded to the flanges 25 in a split mold illustrated in FIGS. 6 and 7.

As shown in FIG. 6 during cooling of the molded body, the mold cavity is bounded by respective walls of two principal mold members 16 slidably supported on two cylindrical bars 15. The cavity conforms to the shape of the body to be produced therein, and the bars 15 are coaxial with the body. The mold is split along the broken line 17 in a manner also evident from the hatching of the two mold members 16. The mold cavity is bounded in a radially outward direction by ring segments 19 of which two are seen in FIG. 6. They sealingly engage radial faces 20 of the mold members 16.

The two coaxial bars 15 have reduced, axially spaced end portions 18 dimensioned to be received in respective flanges 25, the flanges being held in their proper angular positions by locating pins (not illustrated) on the bars 15 which engage lugs 9.

FIG. 7 shows a portion of one mold member 16, the other one being a mirror image of that illustrated in the perspective view of FIG. 7. The wheel rim 3 is formed in a first cavity portion partly bounded by an annular groove 21 of each mold member 16 and partly by the ring segments 19. The spokes 14 are formed in a second cavity portion communicating with the first portion and bounded by radial walls of the mold members 16 whose configuration is partly seen in FIG. 7 and repeated over the entire wall.

Face portions 22, 23 having each the approximate shape to the sector of a circle alternate about the cavity axis. The face portion 22, as a whole, is axially farther from the center of gravity of the mold member 16 which is not visible in FIG. 7, and the face portion 23 is nearer to the center of gravity of the non-illustrated mold member, as is particularly evident in the opened mold. When the mold is in the closed position shown in FIG. 6, a face portion 23 of one mold member is parallel to and opposite a face portion 22 of the other mold member and vice versa.

When considered in more detail, the face portions 22, 23 of each mold member terminate in a radially outward direction in a common circle near the groove 21, and axially diverge from that circle toward the cavity axis so that they are separated by a step 32 whose axial height increases from the first cavity portion toward the cavity axis. Sealing projections 24 extend axially from the face portions 22, 23 nearest the axis. As is best seen in FIG. 6, the projections 24 engage the lugs 9 and prevent liquid molding composition from entering the space between the bars 15. The radial dimensions of the lugs 9 and the projections 24 are approximately equal.

During each molding cycle, the mold members 16, 19 are first positioned as is shown in FIG. 1, the mold assembly is heated to a suitable temperature by liquid passing through non-illustrated channels in the mold members 16, and thermally liquefied resin composition is injected into the mold through a non-illustrated gate, as is conventional. The mold members 16 then are cooled by liquid in a manner not shown, since conventional, until the injected composition solidifies whereupon the mold members may be moved apart, and the molded object withdrawn, whereupon a new cycle may begin.

The further assembly of the flanges 25, spokes 14, and rim 3 with the hub shell 1 and associated elements has been described above.

While polyvinyl chloride has been referred to as a suitable thermoplastic synthetic resin for the spokes 14 and the rim 3, those skilled in the art will readily find other resins that may be compounded in a known manner for use in the plastic parts of the wheel shown in FIGS. 3 to 5. The much simpler plastic elements of the wheel described above with reference to FIGS. 1 and 2 may be molded and assembled with the flanges 5 in a manner obvious from FIGS. 6 and 7.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A vehicle wheel comprising, in combination:
   a. a central hub member having an axis;
   b. a peripheral rim member centered substantially coaxially with the hub member;
   c. two axially spaced spoke means having having radially inner-respective peripheral portions fixedly fastened to said rim member and respective central portions, said spoke means essentially consisting of thermoplastic synthetic resin composition;
   d. two flange means securing said central portions to respective axially terminal portions of said hub member against relative angular movement about said axis; and
   e. thermal insulating means interposed between said spoke means and said hub member for impeding radial flow of thermal energy from said hub member to said spoke means.

2. A wheel as set forth in claim 1, wherein said insulating means include a body of air radially interposed between respective portions of each flange means and said hub member.

3. A wheel as set forth in claim 1, wherein said insulating means are radially interposed between respective portions of each spoke means and the associated flange means.

4. A wheel as set forth in claim 1, wherein said insulating means include a body of air radially interposed between respective portions of said flange means.

5. A wheel as set forth in claim 4, wherein each flange means includes a flange member having a radially inner portion secured to said hub member and a radially outer portion secured to the associated spoke means, said portions of the flange member radially bounding a recess in said flange member, said body of air being received in said recess.

6. A wheel as set forth in claim 4, wherein each flange means includes a flange member having a radially inner portion secured to said hub member and a radially outer portion secured to the associated spoke means, said portions of the flange member radially bounding a plurality of recesses in said flange member, said recesses being elongated along a common circle about said axis, said inner and outer portions of the flange member being integrally connected by bridge portions circumferentially interposed between two of said recesses, the combined circumferential dimension of said bridge portions being but a small fraction of the combined circumferential dimension of said recesses.

7. A wheel as set forth in claim 1, wherein said flange means each include a flange member having a contact face, and said terminal portions of said hub member have respective contact faces abuttingly engaging the contact faces of respective flange members, the engaged portions of said contact faces being dimensioned to constitute portions of said thermal insulating means.

8. A wheel as set forth in claim 7, further comprising two collars annular about said axis and fixedly fastened on said hub member in axially spaced relationship, and a plurality of projections radially extending from each collar, said projections carrying respective portions of the contact face of said hub member.

9. A wheel as set forth in claim 8, wherein said flange member is formed with a plurality of recesses bounded by respective portions of the contact face of said flange member, said projections being received in respective recesses of said flange member.

10. A wheel as set forth in claim 1, wherein each flange means includes a flange member having a radially inner portion extending about said axis in a first arc, and a plurality of circumferentially spaced outer lug portions radially projecting from said inner portion, the combined circumferential dimensions of said outer lug portions defining a second arc about said axis substantially smaller than said first arc, said outer lug portions being each formed with an aperture extending axially therethrough.

11. A wheel as set forth in claim 10, wherein said spoke means each include a set of spoke members circumferentially spaced from each other so as to define gaps therebetween, one of said outer portions being embedded in each spoke member, the resin composition of each spoke member substantially filling the aperture in the associated outer lug portion, each spoke member being axially aligned with a gap in the other set.

12. A wheel as set forth in claim 1, wherein said rim member essentially consists of said thermoplastic synthetic resin composition, said rim member and said spoke means jointly constituting a unitary body, said hub member having an exposed surface about said axis axially intermediate said central portions of said spoke means, each spoke means extending in a substantially conical surface about said axis, said surfaces converging axially from said axis toward said rim member, each spoke means including a plurality of spoke members circumferentially spaced to define gaps therebetween, each gap being axially aligned with a spoke member of the other spoke means.

13. A split mold for molding the unitary body set forth in claim 12, said mold including two mold members movable toward and away from a position of engagement, respective walls of said mold members in said position bounding a cavity substantially conforming to said unitary body and facing each other in the direction of said axis, each wall having a plurality of sector-shaped face portions angularly distributed about said axis, respective circumferentially alternating face portions of each wall being axially near and axially remote from the wall of the other mold member, said face portions of the walls defining portions of said cavity conforming to said spoke members, positioning means for securing said flange means in said cavity in a position in which respective parts of said flange means are embedded in said spoke members when said cavity is filled with said thermoplastic synthetic resin composition.

14. A mold as set forth in claim 13, further comprising means defining a portion of said cavity conforming to said rim member and communicating with said portions of the cavity conforming to said spoke members, said positioning means securing said flange means in respective positions offset in opposite axial directions from the portion of said cavity conforming to said rim member.

15. A mold as set forth in claim 13, further comprising two support members supporting said mold members respectively, one of said support members guiding said mold members toward and away from said position of engagement, said support members having respective terminal portions spaced from each other in the direction of said axis when said mold members are in said position of engagement, said terminal portions including said positioning means.

16. A mold as set forth in claim 13, further comprising sealing means on each of said face portions for limiting radially inward flow of said thermoplastic synthetic resin composition from the portion of said cavity defining said spoke members.

* * * * *